(12) United States Patent
Bachman (10) Patent No.: US 9,333,426 B1
(45) Date of Patent: May 10, 2016

(54) USING GAME DATA FOR PROVIDING CONTENT ITEMS

(71) Applicant: Google Inc., Mountain View, CA (US)

(72) Inventor: Michael Bachman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/197,155

(22) Filed: Mar. 4, 2014

Related U.S. Application Data (63) Continuation of application No. 13/590,738, filed on Aug. 21, 2012, now abandoned.

(51) Int. Cl.
*A63F 13/30* (2014.01)

(52) U.S. Cl.
CPC ........................... *A63F 13/12* (2013.01)

(58) Field of Classification Search
CPC .................................. A63F 9/24; A63F 13/00
USPC ............................................................ 463/31
See application file for complete search history.

(56) References Cited

U.S. PATENT DOCUMENTS

| | | | |
|---|---|---|---|
| 7,677,970 B2 | 3/2010 | O'Kelley et al. | |
| 7,987,194 B1 * | 7/2011 | Walker et al. | 707/758 |
| 8,121,893 B1 * | 2/2012 | Krikheli et al. | 705/14.1 |
| 8,291,340 B1 * | 10/2012 | Shuster | 715/781 |
| 2005/0044224 A1 | 2/2005 | Jun et al. | |
| 2005/0277474 A1 | 12/2005 | Barry | |
| 2007/0077993 A1 | 4/2007 | Midgley et al. | |
| 2008/0102947 A1 * | 5/2008 | Hays et al. | 463/31 |
| 2009/0054140 A1 * | 2/2009 | Beser et al. | 463/31 |
| 2009/0239663 A1 * | 9/2009 | Ferdinand et al. | 463/29 |
| 2010/0235266 A1 * | 9/2010 | Sirajuddin et al. | 705/30 |
| 2011/0159964 A1 * | 6/2011 | Schiappa et al. | 463/42 |
| 2011/0258049 A1 * | 10/2011 | Ramer et al. | 705/14.66 |
| 2012/0158513 A1 * | 6/2012 | Schoen et al. | 705/14.66 |
| 2013/0005475 A1 * | 1/2013 | Mahajan | A63F 13/10 463/42 |
| 2013/0006736 A1 * | 1/2013 | Bethke et al. | 705/14.12 |

OTHER PUBLICATIONS https://partner.steamgames.com/documentation/api; "API Overview," http://www.steampowered.com/steamworks/index.php, retrieved Nov. 16, 2011, 3 pages.
https://partner.steamgames.com/documentation/community_data; "Community Data," http://www.steampowered.com/steamworks/index.php, retrieved Nov. 16, 2011, 2 pages.
https://partner.steamgames.com/documentation/running_on_steam; "Running on Steam," http://www.steampowered.com/steamworks/index.php, retrieved Nov. 16, 2011, 3 pages.

* cited by examiner

*Primary Examiner* — Jason Skaarup
(74) *Attorney, Agent, or Firm* — Fish & Richardson P.C.

(57) ABSTRACT

Methods and systems for receiving a request for content associated with a game, receiving at least one of a device identifier and at least one of game data, associating the device identifier with the game data to create a document, and retrieving the document to generate relevant content items for display on the web page.

18 Claims, 4 Drawing Sheets

USING GAME DATA FOR PROVIDING CONTENT ITEMS

RELATED APPLICATIONS

The present application claims priority to and is a continuation of U.S. patent application Ser. No. 13/590,738, entitled "Using Game Data for Providing Content Items," filed Aug. 21, 2012, the entirety of which is hereby incorporated by reference.

BACKGROUND

The present disclosure relates generally to systems and methods for using game data for providing content items and more particularly, to associating device identifiers with the game data to create a document to enable content providers to provide relevant content items for display to a user.

SUMMARY

In one implementation, in general, a computer-implemented method includes receiving a request for content associated with a game, wherein the associated content is integrated with a web page. The method may also include receiving at least one of a device identifier and at least one of game data. The method may further include storing the game data and the device identifier in a memory. The method may include associating the device identifier with the game data to create a document, wherein the document comprises a gaming user list. The method may include storing the document in a memory. The method may also include retrieving the document to generate relevant content items for display on the web page.

In another implementation, in general, a system may include a processing circuit configured to receive a request for content associated with a game, wherein the associated content is integrated with a web page. The processing circuit may be configured to receive at least one of a device identifier and at least one of game data. The processing circuit may also be configured to store the game data and the device identifier in a memory. The processing circuit may be configured to associate the device identifier with the game data to create a document, wherein the document comprises a gaming user list. The processing circuit may also be configured to store the document in a memory. The processing circuit may be configured to retrieve the document to generate content items for display to a user.

In yet another implementation, in general, a computer-readable storage medium having instructions therein, the instructions being executable by a processor to cause the processor to perform operations including receiving a request for content associated with a game, wherein the associated content is integrated with a web page. The operations may also include receiving at least one of a device identifier and at least one of game data. The operations may further include storing the game data and the device identifier in a memory. The operations may include associating the device identifier with the game data to create a document, wherein the document comprises a gaming user list. The operations may include storing the document in a memory. The operations may also include retrieving the document to generate relevant content items for display on the web page.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A content provider (e.g., a publisher of a web page, an advertiser, etc.) may want to provide relevant content to a specific user who has played a particular game on a client device or any other appropriate system. The content provider may also want to provide relevant content to a user who has reached an achievement within a game or a user that plays the game with a specified level of frequency, e.g., a specified number of hours per week and so on.

The system may create an application programming interface (API) that can set appropriate identifiers, e.g., cookies, for remarketing and remote procedure calls (RPC) to store information related to the game, e.g., meta data, levels, achievements, etc.

In some implementations, the API may be provided to publishers of the game itself. In another implementation, a database or repository for gaming information may be provided to the publishers. The database may be distributed to a content provider or source to access the gaming information. In yet another implementation, remarketing list capabilities based on the gaming information may be provided to a game publisher and/or content provider to determine and provide appropriate content for another content provider and/or a user.

The API may also be used to facilitate the generation of lists of users as well as the associated types (e.g., conversion types, etc.), which are associated with a content item group. This list may be sold to advertisers. The advertisers may target users on the list by specifying higher bids for such users. For example, when a user is searching or viewing content, the content item may be provided to the user (e.g., responsive to a content item request). The API may also be used to facilitate the generation of the customization of lists of users, e.g., the combination of one or more lists. In some implementations, the growth of the list may be monitored, e.g., the number of users.

Content providers may thus be able to re-market or provide content to the user via an online network by purchasing the list of users from a game provider. Content providers may also be a part of a revenue share model with regard to conversions. For example, a portion of revenues received from an advertiser in connection with a content item provided to a user that has reached a level of achievement within a game may be shared with the game provider.

In an alternative implementation, a content provider (e.g., an advertiser) and a gaming publisher may enter into a direct deal, instead of using the affiliate like system as described above and herein. In yet another implementation, gaming publishers may integrate a content overlay into the games, e.g., directly monetizing usage, but not providing access to remarketing campaigns, such as the system described herein.

The user may opt in or out of receiving relevant content items from a content selection server. Also, the user may opt-in or out-out allowing a content selection server or other content source to identify and store information about the user and/or about the devices operated by the user. For example, the user may opt in to receiving a content item from the content selection server that may be more relevant to him or her. In one implementation, the user may be represented as an anonymized user identifier (e.g., a cookie, a device serial number, etc.) that contains no personally-identifiable information about the user. For example, information relating to the user's name, demographics, etc., may not be used by the content selection server unless the user opts in to providing such information. Thus, the user may have control over how information is collected about him or her and used by the content selection server or other content source.

If the content item is selected based in part on a user identifier for a user that opts in to receiving more relevant content items, a content provider may specify that certain content is to be provided to a set of user identifiers. For example, the content provider may identify a set of user identifiers associated with visiting the content provider's website and making a purchase. Such users may later wish to know if the content provider is running a sale. In some cases, the content network may identify users on behalf of the content provider that may be interested in receiving content items from the content provider. For example, content providers may specify a number of topic categories for their content items and the content network may match users' interests to the categories, to provide relevant content items to the users.

Figure 1:
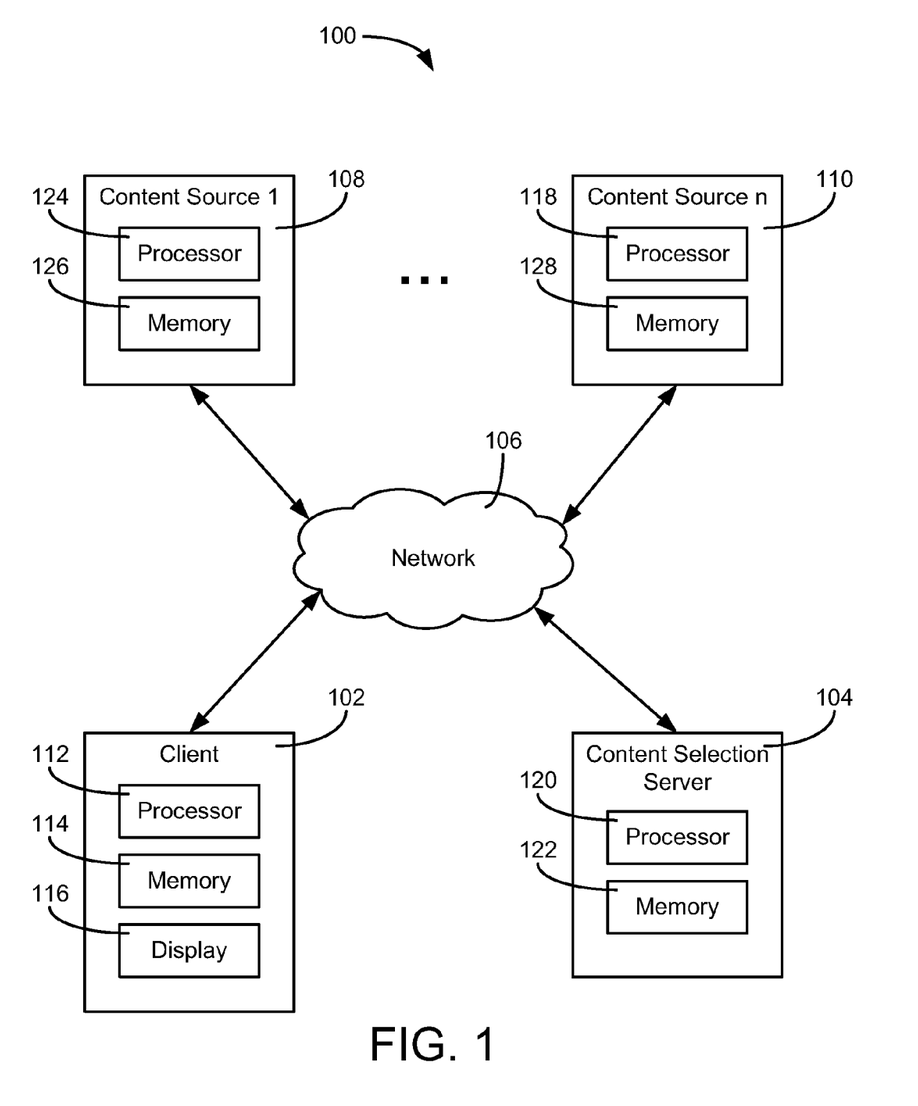
FIG. 1 is an example of a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may include a content selection server 104, which provides content items data to other computing devices over network 106.

Network 106 may be any form of computer network that relays information between client 102, content selection server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content selection server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content selection server 104 may include a processing circuit including a processor 120 and a memory 122. In some implementations, content selection server 104 may include several computing devices (e.g., a data center, a network of servers, etc.). In such a case, the various devices of content selection server 104 may comprise a processing circuit (e.g., processor 120 represents the collective processors of the devices and memory 122 represents the collective memories of the devices).

Content selection server 104 may provide digital content items to client 102 via network 106. For example, content source 108 may provide a webpage to client 102, in response to receiving a request for a webpage from client 102. In some implementations, a content items from content selection server 104 may be provided to client 102 indirectly. For example, content source 108 may receive content item data from content selection server 104 and use the content item as part of the webpage data provided to client 102. In other implementations, a content item from content selection server 104 may be provided to client 102 directly. For example, content source 108 may provide webpage data to clients client 102 that includes a command to retrieve an content item from content selection server 104. On receipt of the webpage data, client 102 may retrieve a content item from content selection server 104 based on the command and display the content item when the webpage is rendered on display 116.

According to various implementations, a user of client 102 may search for, access, etc., various documents (e.g., web pages, web sites, articles, images, video, etc.) using a search engine via network 106. The web pages may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In another implementation, advertisers may purchase or bid on the search terms such as keyword entries entered by users into a document such as a search engine. When the search term or keyword are entered into the document, then advertising data such as links to an advertiser website may be displayed to the user. In some implementations, server 104 may use an auction model that generates a content item. Advertisers may bid on keywords using the auction model. The auction model may also be adjusted to reflect the maximum amount an advertiser is willing to spend so that a user is exposed to a content item a minimum number of times.

A user may opt in or out of allowing content selection server 104 or other content source to identify and store information about the user and/or about devices operated by the user. For example, the user may opt in to receiving content items from content selection server 104 that may be more relevant to her. In one implementation, the user may be represented as a randomized device identifier (e.g., a cookie, a device serial number, etc.) that contains no personally-identifiable information about the user. For example, information relating to the user's name, demographics, etc., may not be used by an content selection server unless the user opts in to providing such information. Thus, the user may have control over how information is collected about him or her and used by an content selection server or other content source.

In some implementations, the device identifier is associated with a particular instance of a client application (e.g., running on client device 102). In some implementations, the device identifier is associated with a user (e.g., when the user logs in with a username and password). Some information that may be associated with the user may include events, such as one or more queries, one or more clicks, browser history data (e.g., the URLs visited, the number of URLs viewed, URL visit durations, etc.), etc. Events may also include advertising metrics, such as impressions, click through rate, etc. for each user. For example, the device identifier may include a time stamp associated with a particular event. Events may also include how many times a user is exposed to a particular content item, a campaign, etc.

Content source 108, 110 may select content to be provided with a webpage based on the device identifier for a user visiting the web page. For example, a user may opt in to receiving relevant content items from an content selection server. Rather than selecting a content item to be provided on the web page based on the content of the web page itself or on other factors, content selection server 104 may take into account the device identifier provided as part of the content request. In one example, a user may visit a number of webpages devoted to reviews of golf clubs and later visit a webpage to check stock quotes. Based on the user's visits to the golf-related webpages, the user may be determined to be interested in receiving content items for golf clubs. When the user later visits the webpage to check stock quotes, an online retailer of golf equipment may seek to include a content item on the webpage for that particular user, even though the financial webpage is unrelated to golf.

If content is selected based in part on a device identifier for a user that opts in to receiving more relevant content, a content provider may specify that certain content is to be provided to a set of device identifiers. For example, an advertiser may identify a set of device identifiers associated with visiting the advertiser's website and making a purchase. Such users may later wish to know if the advertiser is running a sale. In some cases, an advertising network may identify users on behalf of the advertiser that may be interested in receiving content items from the advertiser. For example, advertisers may specify a number of topic categories for their content items and the advertising network may match users' interests to the categories, to provide relevant content items to the users.

Figure 2:
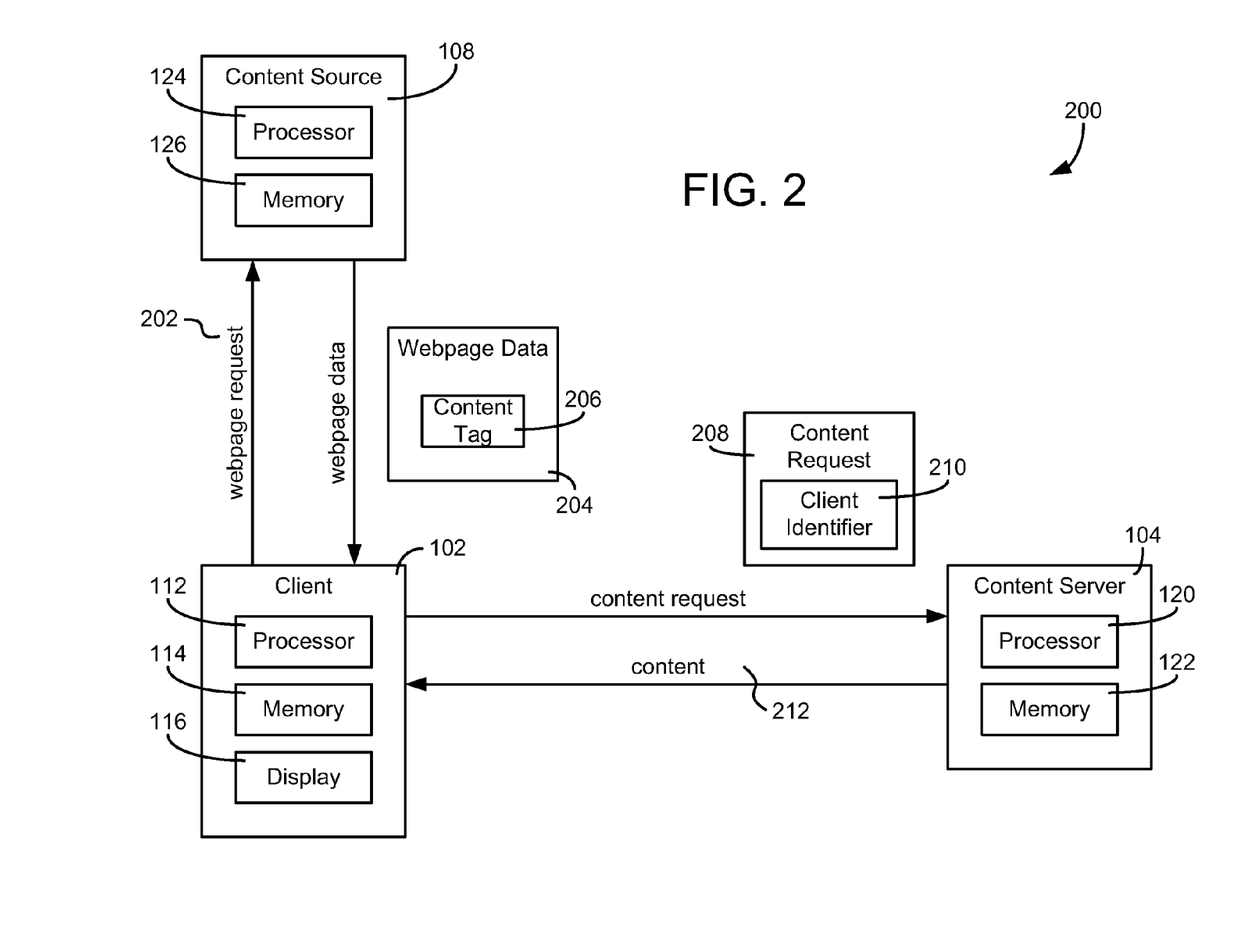
FIG. 2 is an example illustration of content being selected, in accordance with a described implementation.

FIG. 2 is an example illustration of content 212 being selected by content selection server 104. As shown, client 102 may send a webpage request 202 to a content source via network 106, such as content source 108. For example, webpage request 202 may be a request that conforms to the hypertext transfer protocol (HTTP), such as the following:

GET /weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with webpage request 202 to identify client 102 to content source 108.

In response to receiving webpage request 202, content source 108 may return webpage data 204, such as the requested file, "weather.html." Webpage data 204 may be configured to cause client 102 to display a webpage on electronic display 116 when opened by a web browser application. In some cases, webpage data 204 may include code that causes client 102 to request additional files to be used as part of the displayed webpage. For example, webpage data 204 may include an HTML image tag of the form:

<img src="Monday_forecast.jpg">

Such code may cause client 102 to request the image file "Monday_forecast.jpg," from content source 108.

In some implementations, webpage data 204 may include content tag 206 configured to cause client 102 to retrieve a content item from content selection server 104. In some cases, content tag 206 may be an HTML image tag that includes the network location of content selection server 104. In other cases, content tag 206 may be implemented using a client-side scripting language, such as JavaScript. For example, content tag 206 may be of the form:

<script type='text/javascript'>
AdNetwork_RetrieveAd("argument")
</script>

Where AdNetwork_RetrieveAd is a script function that causes client 102 to send an content request 208 to content selection server 104. In some cases, the argument of the script function may include the network address of content selection server 104, the referring webpage, and/or additional information that may be used by content selection server 104 to select content to be included with the webpage.

Content request 208 may include a client identifier 210, used by content selection server 104 to identify client 102. In various implementations, client identifier 210 may be an HTTP cookie previously set by content selection server 104 on client 102, the IP address of client 102, a unique device serial for client 102, other forms of identification information, or combinations thereof. For example, content selection server 104 may set a cookie that includes a unique string of characters on client 102 when content is first requested by client 102 from content selection server 104. Such a cookie may be included in subsequent content requests sent to content selection server 104 by client 102.

In some implementations, client identifier 210 may be used by content selection server 104 to store history data for client 102, with the permission of the user of client 102. For example, content request 208 may include data relating to which webpage was requested by client 102, when the webpage was requested, and/or other history data. Whenever client 102 visits a webpage participating in the content network, i.e., a webpage that includes a content item or other content selected by content selection server 104, content selection server 104 may receive and store history data for client 102. In this way, content selection server 104 is able to reconstruct the online history of client 102 regarding webpages in the content network. In some implementations, content selection server 104 may also receive history data for client 102 from entities outside of the content network. For example, a website that does not use content selected by content selection server 104 may nonetheless provide information about client 102 visiting the website to content selection server 104, with the user's permission.

In some cases, client identifier 210 may be sent to content selection server 104 when the user of client 102 performs a particular type of online action. For example, webpage data 204 may include a tag that causes client 102 to send client identifier 210 to content selection server 104 when the a displayed content item is selected by the user of client 102. Client identifier 210 may also be used to record information after client 102 is redirected to another webpage. For example, client 102 may be redirected to an advertiser's website if the user selects a displayed content item. In such a case, client identifier 210 may also be used to record which actions were performed on the advertiser's website. For example, client identifier 210 may also be sent to content selection server 104 as the user of client 102 navigates the advertiser's website. In this way, data regarding whether the user searched for a product, added a product to a shopping cart, completed a purchase on the advertiser's website, etc., may also be recorded by content selection server 104. In some implementations, content selection server 104 may use the data regarding users' online actions to calculate performance metrics for a webpage (e.g., a conversion rate, a click-through rate, etc.).

In response to receiving content request 208, content selection server 104 may select content 312 to be returned to client 102 and displayed on display 116. For example, content selection server 104 may select content 212 based on client identifier 210 and/or on a user identifier associated with client identifier 210. In one implementation, content selection server 104 may determine whether client identifier 210 corresponds to a similar user identifier as that of one or more other user identifiers. For example, content selection server 104 may determine whether a client identifier for client 102 is associated with characteristics that are similar to that of one or more other user identifiers specified by an advertiser. Content selection server 104 may analyze history data for the one or more user identifiers specified by the advertiser to identify characteristics of the user identifiers. The characteristics may be compared to those of the user identifier associated with client 102 to determine its similarity. In some implementations, content selection server 104 may determine a similarity score to represent how similar the characteristics of the user identifier is to that of the user identifiers specified by the advertiser.

In some implementations, content selection server 104 may use characteristics of the one or more user identifiers specified by an advertiser or other content source to train a behavioral model. For example, a large number of user identifiers associated with online purchases of insurance may have recently visited a webpage that compares rates among different insurance carriers. Such a characteristic may be used in a behavioral model by content selection server 104 to identify other user identifiers of users that may also be interested in purchasing insurance. In some implementations, the behavioral model may be constructed by representing a user identifier as a set of feature vectors. In general, a feature vector refers to an n-dimensional vector of characteristics of a user identifier, such as information about online actions associated with the user identifier. Characteristics of a user identifier may include webpages visited by the user identifier, content items selected by the user identifier, and/or content items selected by the user identifier that led to a conversion. In general, a conversion refers to the performance of a certain action. Typically, the action is the purchase of a good or service. For example, a selected content item that led to a conversion may be a content item that diverted a client device to a website at which a purchase was made. Other examples of conversions include creating a user profile on a website, subscribing to receive marketing offers (e.g., by providing a postal or email address, by providing a telephone number, etc.), or downloading software from a website.

In some implementations, characteristics of user identifiers may be normalized by utilizing a term-frequency inverse document frequency (TF-IDF) count. Webpages visited by a user identifier may be represented by their uniform resource location (URL) or similar addresses. A selected content item may be a content item embedded into a webpage, a game, a pop-up content item, a banner content item, or the like.

In some implementations, content selection server 104 may aggregate feature vectors to find a set of characteristics based on a statistical measurement of the aggregated characteristics. For example, the aggregated characteristics may be the number of times a webpage was visited by the set of user identifiers, the number of times a content item or group of content items was selected, and/or the number of times a content item or group of content items led to a conversion. In various implementations, a statistical measurement of the aggregated characteristics may be the average, median, centroid, or other statistical measure of the aggregated characteristics. In one implementation, the aggregated characteristics having the highest amount of activity may be selected (e.g., the top five most visited webpages, the top ten selected content items, etc.).

A received set of user identifiers may be subdivided by content selection server 104 into clusters to generate the behavioral model, in one implementation. In some cases, different groups of user identifiers may be associated with the same event and may be associated with widely different interests and motivations. For example, a roll of copper tubing may be purchased from an online hardware store both by plumbers and by hobbyists that homebrew beer. In such a case, the online histories for these two groups may widely differ. For example, the short-term histories of the plumbers may include a number of webpages devoted to making a certain type of plumbing repair. Likewise, the short-term histories of the hobbyists may include a number of webpages devoted to do-it-yourself projects to make a heat sink using copper tubing. Using clustering allows for the different groups of user identifiers to be treated separately in the behavioral model.

In some implementations, feature vectors may be subdivided into clusters by computing a weighted nearest-neighbor list for each user identifier in the set of user identifiers that content selection server 104 uses to train the behavioral model. For example, the feature vectors may be analyzed by content selection server 104 to determine which vectors are closest to one another. In one implementation, the nearest-neighbor list for the received set of user identifiers may be determined by applying a k-nearest-neighbor (KNN) algorithm, or similar algorithm, to the feature vectors. For example, webpages visited by plumbers may be used to form one cluster, while webpages visited by home brewing hobbyists may be used to form a second cluster, based on their nearest neighbors.

In some implementations, content selection server 104 may calculate a similarity score for the user identifier associated with client 102 based on how similar the characteristics of the user identifier are to those of one or more user identifiers specified by an auction participant (e.g., an advertiser or other content provider). For example, an advertiser may send a request to content selection server 104 to identify a user identifier similar to one or more user identifiers specified by the advertiser. Content selection server 104 may determine whether the user identifier associated with client 102 is a similar user identifier and generate a similarity score for the user identifier. In some implementations, content selection server 104 may automatically generate a bid for the advertiser or other content provider, in response to content selection server 104 receiving content request 208 from client 102. For example, if the user identifier of client 102 is determined to be similar to user identifiers specified by an advertiser, content selection server 104 may generate a bid in the auction on behalf of the advertiser. In one implementation, the bid may be determined by content selection server 104 based in part on the similarity score for the user identifier associated with client 102. Based on the results of the auction, content selection server 104 may select content 212 and return the content to client 102 or return an instruction to client 102 configured to cause client 102 to retrieve content from another source.

Figure 3:
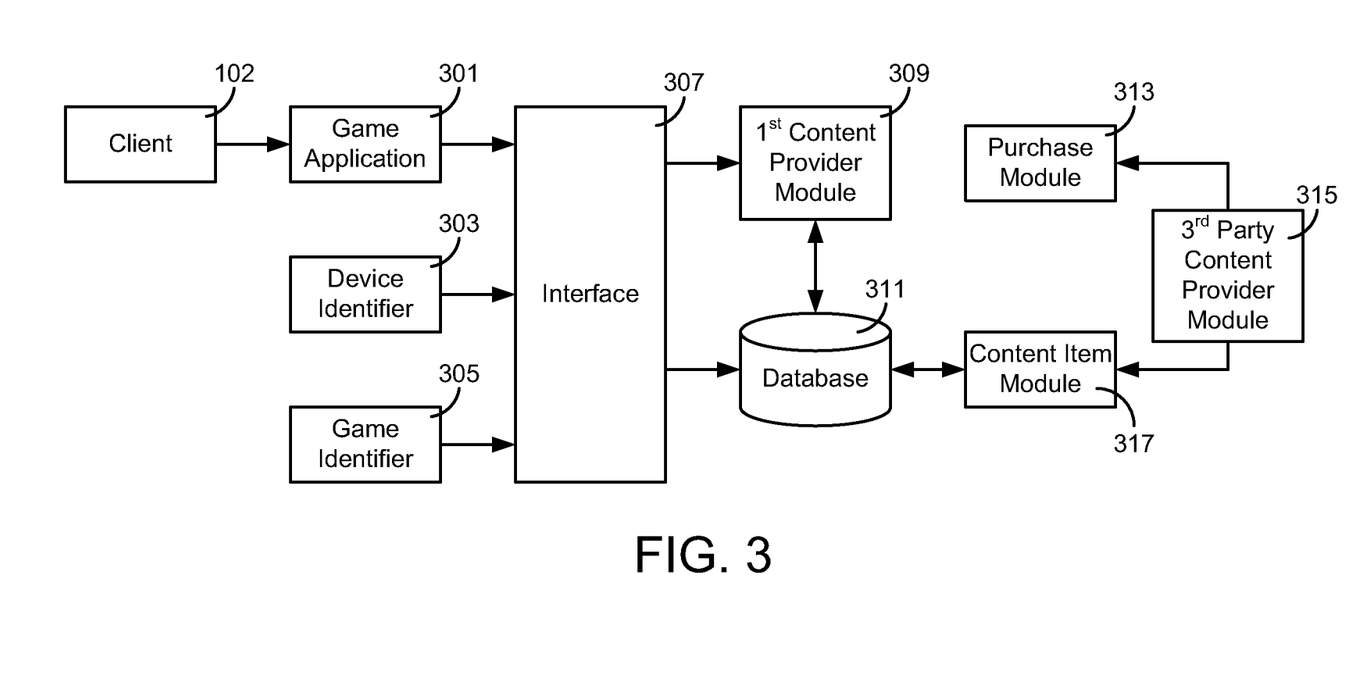
FIG. 3 is an illustration of an example system in accordance with a described implementation.

FIG. 3 is an example of an illustration of a block diagram of a system 300 in accordance with a described implementation. System 300 may be used with various types of content and content items, including content items. In some implementations, system 300 may be implemented in a social networking environment to serve content and/or content items alongside a game.

In a brief overview, FIG. 3 depicts that a publisher of a website integrates a software development kit (SDK), which may be provided by a game provider, a social networking provider, etc. or an API into a game. The user interacts with the game by playing the game and/or reaching a particular level. The SDK/API creates and stores a device-based (non-human readable) identifier. The SDK/API hashes the identifier and then sends out an RPC (remote procedure call) to the social networking provider, game provider, etc. with the hashed identifier. The gaming hashed identifiers, the associated publishers, user lists, and user's gaming actions (e.g., levels completed) are stored in the system. Search, content and display content item requests read the hashed identifier information to provide relevant content items to the user. System 300 may assist in creating and integrating the SDK/API, which may be used to create lists of users that reach particular gaming achievements, that exhibit a particular frequency of playing the game, etc. These users lists may then be used by content providers to select criteria that will match with these users in their campaigns.

More specifically, client device 102 may receive game application 301. In some implementations, client device 102 may download game application 301 from a web site, a server, etc. In another implementation, client device 102 may use the game application 301 via another website, e.g., by using an applet. Other ways for client device 102 to receive game application 301 may also be implemented. For example, game identifier 305 may be received by client 102. In some implementations, game identifier 305 may be analogous to a session identifier that identifies the session. Game identifier 305 may keep track of the current state of the user's game (e.g., levels, achievements, etc.). In other implementations, game identifier 305 may be used by the gaming web site to send state information to client device 102 and for client device 102 to return the state information to the web site using device identifier 303. The state information may be used for authentication, identification of the user, the user's preferences, or any additional information that may be stored as data on client device 102.

Interface 307 of system 300 receives information associated with the user (e.g., game information, social networking information) and/or media accessed by the user. Interface 307 allows the user to interact with the game. Interface 307 may include a graphical user interface, a command line interface, a text-based interface, etc. Interface 307 receives information from game application 301 along with information from client device 301 to present the game to the user.

Interface 307 may also include the API, which allows game application 301 to communicate with first party content provider (e.g., game provider) 309, database 311, and any other component over the Internet. The communication may take place through remote procedure calls. In some implementations, the API sets an identifier, e.g., device identifier 303, for remarketing. The identifier may be based on the user. The API may place a remote procedure call for particular gaming information with an identifier, e.g., game identifier 305, device identifier 303, or any other random identifier using a unique identification number generated by a web server to identify each user on the web site.

First party content provider module 309 may receive gaming information and other important information related to providing relevant content via the game through interface 307. For example, interface 307 may be provided to first party content provider module 309 for the first party content provider to input selection criteria or other appropriate criteria to serve relevant content to the user. In some implementations, the first party content provider may provide other useful selection information about the user, e.g., information collected during registration to play the game.

A third party content provider (e.g., advertiser) module 315 may access interface 307 to set up remarketing lists. In some implementations, the list may be set up by the game provider. In other implementations, the list may be set up by the advertiser. For example, the third party content provider module 315 may be a publisher that logs onto a web site to determine which remarketing lists are for sale. The third party content provider may access third party content provider module 315 to select a gaming user list. Database 311 may store the gaming user list and/or the remarketing lists.

The third party content provider module 315 may purchase the user lists via interface 317. In some implementations, third party content provider module 315 may modify, edit, etc. the user lists via interface 317. In other implementations, third party content provider module 315 may contact the first party content provider via interface 317. Interface 317 may also access database 311, which may store the user lists and/or gaming information associated with game application 301 for the third party content provider. The third party content provider may utilize the user lists, gaming information, and other meta data stored in database 311 to determine selection criteria. The selection criteria may then be used to provide relevant content to the user.

Figure 4:
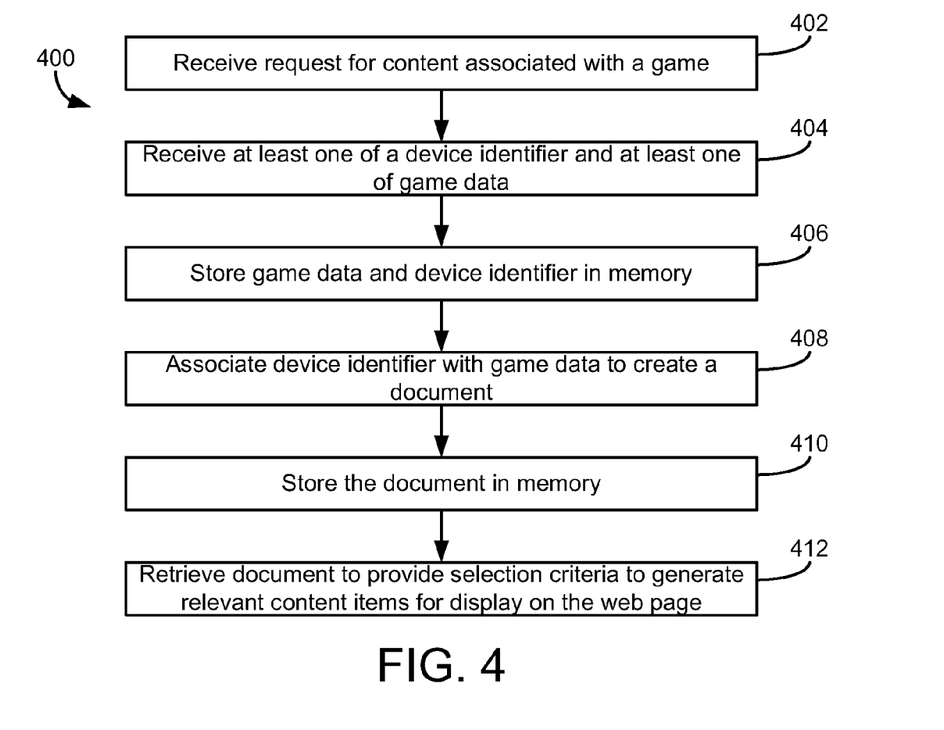
FIG. 4 is an example of a flow diagram in accordance with a described implementation Like reference numbers and designations in the various drawings indicate like elements.

FIG. 4 is an example of a flow diagram of a method 400 for retrieving a document to provide selection criteria to generate relevant content items for display on a web page. Example method 400 may be implemented by various combinations of systems. Example method 400 may be performed online or offline.

Example method may begin at block 402, request for content associated with a game is received. For example, the request for content may be a content item request. In some implementations, the associated content may be integrated with a web page. The content may include embedded code, PDF documents, other file formats, images, hyperlinks, articles, etc. Selection of the content may cause an HTTP request to be made to a content selection server for additional content and/or content items.

At block 404, a device identifier may be received. In some implementations, game data may be received. The game data may include a user profile, user preferences, user statistics, and other user information related to the game. The device identifier may be collected for a single session of the game, such as matching the device and game information to a session identifier. The information may be made anonymous but may still receive appropriate information for a more enjoyable game session for a user.

At block 406, the device identifier may be stored in a memory. In some implementations, the game data may be stored in the memory. In some implementations, the device identifier and/or game data may be stored in the memory of a mobile computing device of a user. Alternatively, the device identifier and/or game data may be stored in a memory located within the system, such as a server.

At block 408, the device identifier is associated with the game data to create a document, e.g., a user list. In some implementations, the document is a gaming user list. In other implementations, the document is a remarketing list. The remarketing list may be accessed by a first party content provider (e.g., a web site publisher) or a third party content provider (e.g., an advertiser). The remarketing list may include users who visited specific sites within the game, reached a specific level, played the game at a certain time or for a specified amount of time, etc. This information may be included within a master list or a number of different lists may be created.

At block 410, the document may be stored in a memory. In some implementations, the document may be stored in a memory in a server. The server may be related to the game (e.g., a social networking web site server). In another implementation, the server may be a third party server, e.g., an advertiser, a publisher, etc.

At block 412, the document is retrieved to generate relevant content items for display on the web page. In some implementations, the document is used to provide selection criteria to generate the relevant content items, which may be integrated into the game. The selection criteria may include, but is not limited to, demographics, placement, and time of day. In some implementations, the third party content provider (e.g., an advertiser) may purchase the document. In some implementations, method 300 may also include creating the document by embedding a tag into the web page. The web page may be a home page.

In an alternative implementation, the method may include integrating, by a server computer, an application programming interface into a game, receiving, by the server computer, an interaction with the game, setting, by the application programming interface, an identifier for remarketing based on the interaction, associating, by the application programming interface, the game with the remarketing identifier to create a report; and providing the report as display data.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is tangible.

The operations described in this specification can be performed by a data processing apparatus on data stored on one or more tangible computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product embodied on a tangible storage medium or packaged into multiple software products embodied on tangible storage media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for using game data for providing content items, comprising:
   executing, by a video game console, a web application;
   monitoring, by the video game console, a state of the application by a user of the application, including:
      storing, a device identifier and an identifier of a state of the application, in a web cookie on the video game console;
   transmitting, by the video game console to a gaming server, a request for content, the request comprising a portion of the web cookie that includes the device identifier and the identifier of the state of the application, responsive to the monitoring of the state of the web application determining that the user has reached a predetermined state;
   receiving, by the video game console from the gaming server, an item of content selected by the gaming server based on analyzing the portion of the web cookie, responsive to the state of the web application identified in the request, the item of content and state of the web application associated together with a remarketing list comprising a plurality of device identifiers, including the device identifier transmitted in the request for content, of devices that have executed the web application and whose users also reached the predetermined state of the web application during execution, wherein the remarketing list is accessible by a content provider of the item of content, not by the video game console; and
   displaying, by the video game console, the received item of content;
   wherein the web application is a web game, and wherein the state of the web application is a gameplay state.

2. The method of claim 1, further comprising generating, by the video game console, the identifier of the state of the web application based on an achievement obtained by the user during gameplay.

3. The method of claim 1, further comprising generating, by the video game console, the identifier of the state of the web application based on a level reached by the user during gameplay.

4. The method of claim 1, further comprising generating, by the video game console, the identifier of the state of the web application based on a frequency of execution of the web application by the user.

5. The method of claim 1, wherein receiving the item of content selected by the gaming server responsive to the state of the web application identified in the request further comprises receiving the item of content selected by the gaming server responsive to adding the device identifier transmitted in the request for content to the remarketing list of devices that have executed the application and whose players users also reached the predetermined state of the web application during execution, the remarketing list associated with the item of content.

6. The method of claim 1, wherein the item of content is associated with the state of the web application responsive to a selection of the state of the web application from a plurality of states of the web application by a provider of the item of content.

7. The method of claim 1, further comprising receiving, by the video game console, the web application.

8. The method of claim 1, wherein executing the web application further comprises:
   executing, by the first video game console on behalf of a third gaming device, the application, and
   transmitting a display of the executed web application to the third gaming device; and
   wherein displaying the received item of content further comprises transmitting a display of the received item of content to the third gaming device.

9. The method of claim 8, wherein transmitting the request for content further comprises transmitting, by the video game console to the gaming server, the request for content, the request comprising a device identifier of the third computing device and the identifier of the state of the web application.

10. A system for using game data for providing content items, comprising:
   a video game console in communication with a second computing device, the first computing device comprising a processor configured for:
   executing a web game application,
   monitoring a state of the application by a user of the application, including:
     storing, a device identifier and an identifier of a state of the application, in a web cookie on the video game console;
   transmitting, by the video game console to a gaming server, a request for content, the request comprising a portion of the web cookie that includes the device identifier and the identifier of the state of the application, responsive to the monitoring of the state of the web application determining that the user has reached a predetermined state;
   receiving, by the video game console from the gaming server, an item of content selected by the gaming server based on analyzing the portion of the web cookie, responsive to the state of the web application identified in the request, the item of content and state of the web application associated together with a remarketing list comprising a plurality of device identifiers, including the device identifier transmitted in the request for content, of devices that have executed the web application and whose users also reached the predetermined state of the web application during execution, wherein the remarketing list is accessible by a content provider of the item of content, not by the video game console; and
   displaying, by the video game console, the received item of content;
   wherein the web application is a web game, and wherein the state of the web application is a gameplay state.

11. The system of claim 10, wherein the processor is further configured for generating the identifier of the gameplay state of the web game application based on an achievement obtained by the player during gameplay.

12. The system of claim 10, wherein the processor is further configured for generating the identifier of the gameplay state of the web game application based on a level reached by the player during gameplay.

13. The system of claim 10, wherein the processor is further configured for generating the identifier of the gameplay state of the web game application based on a frequency of play of the web game application by the player.

14. The system of claim 10, wherein the processor is further configured for receiving the item of content selected by the second gaming server responsive to adding the device identifier transmitted in the request for content to the remarketing list of devices that have executed the web game application and whose players also reached the predetermined gameplay state of the web game application during gameplay, the remarketing list associated with the item of content.

15. The system of claim 10, wherein the item of content is associated with the gameplay state of the web game application responsive to a selection of the gameplay state of the game application from a plurality of gameplay states of the web game application by a provider of the item of content.

16. The system of claim 10, wherein the processor is further configured for receiving the web game application.

17. The system of claim 10, wherein the processor is further configured for:
   executing the web game application on behalf of a third gaming device,
   transmitting a display of the executed web game application to the third gaming device, and
   displaying the received item of content by transmitting a display of the received item of content to the third gaming device.

18. The system of claim 17, wherein the processor is further configured for transmitting, to the second computing device, the request for content, the request comprising a device identifier of the third gaming device and the identifier of the gameplay state of the web game application.

* * * * *